United States Patent [19]

Dutka

[11] Patent Number: 4,966,318

[45] Date of Patent: Oct. 30, 1990

[54] SHOPPING ORGANIZER DEVICE

[76] Inventor: Charlotte Dutka, 154 Primrose La., Bricktown, N.J. 08724

[21] Appl. No.: 321,586

[22] Filed: Mar. 10, 1989

[51] Int. Cl.$^5$ .................. B60R 11/00; A45C 11/34
[52] U.S. Cl. .................. 224/42.46 R; 224/275;
224/277; 224/901; 206/425; 206/831;
280/DIG. 4; 383/86; 383/161
[58] Field of Search ............ 224/901, 273, 275, 277,
224/42.01, 42.41, 42.42, 42.46 R; 206/425, 232,
831, 459; 220/323, 334, 324; 383/86, 161;
280/DIG. 4

[56] References Cited

U.S. PATENT DOCUMENTS

| | | | |
|---|---|---|---|
| 3,232,397 | 2/1966 | McCoy | 206/425 X |
| 4,260,055 | 4/1981 | Slaybaugh | 206/232 |
| 4,274,567 | 6/1981 | Sawyer | 224/42.43 |
| 4,339,061 | 7/1982 | Dunn | 224/42.42 |
| 4,442,940 | 4/1984 | McIntosh | 206/425 |
| 4,450,994 | 5/1984 | Holland | 224/277 |
| 4,463,848 | 8/1984 | Parker | 206/425 X |
| 4,512,504 | 4/1985 | Owlett | 224/42.46 R |
| 4,591,054 | 5/1986 | Blossom | 206/425 |
| 4,730,727 | 3/1988 | Petroff | 206/425 X |
| 4,742,911 | 5/1988 | Manuel | 206/425 |

Primary Examiner—Ernest G. Cusick

[57] ABSTRACT

A shopping organizer device is set forth providing a receptacle formed with a rigid forward and rear wall, and communicating spaced parallel pleated accordion side walls with an associated pleasted bottom wall including a series of dividers container therewithin wherein each divider includes an upwardly extending tab of a first dimension to receive category labels thereon. A plurality of spaced abutment portions are positioned at each end of the upper portion of the forward wall and are of a height equal to the first dimension and are received within spaced ears secured to an interior surface of a pivoted lid to rigidly and securely orient a lid relative to the forward wall and provide a portable and secure organization when not in use.

6 Claims, 1 Drawing Sheet

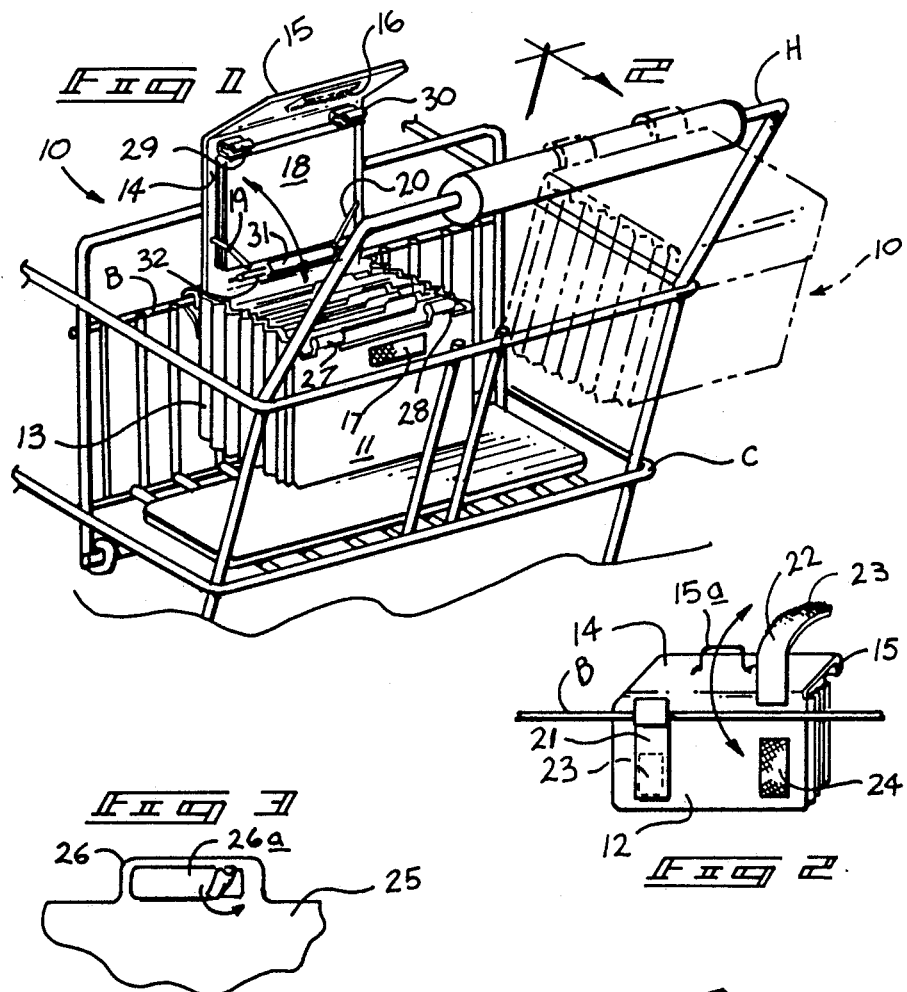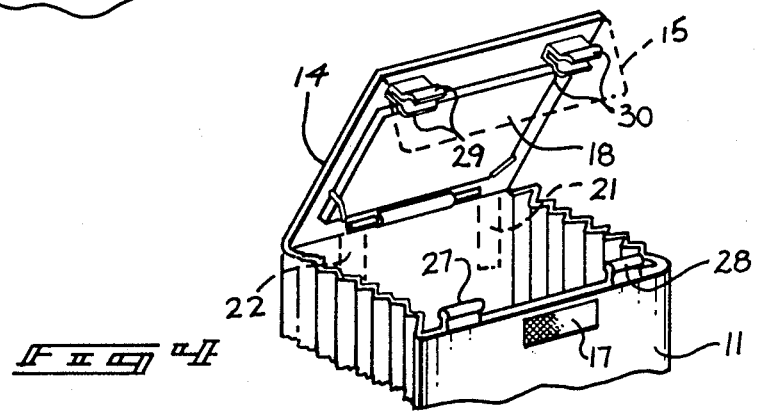

SHOPPING ORGANIZER DEVICE

BACKGROUND OF THE INVENTION

1. Field of the Invention

The field of invention relates to organizer devices, and more particularly pertains to a new and improved shopping organizer wherein the same provides a compact, rigid organization when not in use, and may be readily and effectively opened to facilitate an extension or retraction of the main body of the device for securement of categories of shopping items therewithin.

2. Description of the Prior Art

The use of shopping organizers of various types has been known in the prior art. The organizers of the prior art have typically been of a rigid organization to discourage accordion-type files as utilized by the present invention, or have alternatively been of a category accommodating particular orientation on a shopping cart. For example, U.S. Pat. No. 4,450,994 to Holland sets forth a rigid container utilizing rigid securement loops for securement to a handle of a typical shopping cart. The organization of Holland precludes the selective securement of the receptacle, as desired by an individual.

U.S. Pat. No. 4,260,055 to Slaybaugh sets forth a coupon kit utilizing a flexible pouch provided with scissors and various compartments for securement of coupons therewithin, but fails to provide the securement and extensible receptacle arrangement as set forth by the instant invention.

U.S. Pat. No. 4,591,054 to Blossom sets forth an organizer of pouch-like configuration utilizing various compartments for securement of coupons of various categories therewithin, but as in the former Slaybaugh patent, fails to provide a securement arrangement for enabling the selective attachment of an extensible and retractable receptacle relative to a desired portion of a shopping cart.

U.S. Pat. No. 4,274,567 to Sawyer sets forth a clipboard provided with a pivoted rearward edge that secures a downwardly directed flexible pouch when secured to a basket portion of a shopping cart.

U.S. Pat. No. 4,742,911 to Manuel sets forth a boxlike device that may be opened to provide various pouches for receiving a variety of categories of coupons therewithin.

As such, it may be appreciated that there is a continuing need for a new and improved shopping organizer wherein the same addresses both the problems of convenience of use and effectiveness in organization and in this respect, the present invention substantially fulfills this need.

SUMMARY OF THE INVENTION

In view of the foregoing disadvantages inherent in the known types of shopping organizers now present in the prior art, the present invention provides a shopping organizer device wherein the same provides a rigid, container-like organization when not in use and may provide an accordion-like receptacle arrangement when the lid is pivotally removed from the receptacle portion of the device. As such, the general purpose of the present invention, which will be described subsequently in greater detail, is to provide a new and improved shopping organizer device which has all the advantages of the prior art shopping organizers and none of the disadvantages.

To attain this, the present invention comprises a shopping organizer wherein the same sets forth a receptacle pouch provided with a forward and rear rigid wall with accordion side walls therebetween to enable extension or retraction of the forward wall relative to the rear wall wherein the lid includes spaced ears to receive spaced abutments formed on the upper edge of the forward wall to rigidly position the forward wall relative to the lid and rear wall during periods of non-use. The device further sets forth an elastic band arrangement for securement of a notebook and a writing instrument to an interior surface of the lid and further utilizes various securement straps for securing the organization relative to a desired portion of a shopping cart.

My invention resides not in any one of these features per se, but rather in the particular combination of all of them herein disclosed and claimed and it is distinguished from the prior art in this particular combination of all of its structures for the functions specified.

There has thus been outlined, rather broadly, the more important features of the invention in order that the detailed description thereof that follows may be better understood, and in order that the present contribution to the art may be better appreciated. There are, of course, additional features of the invention that will be described hereinafter and which will form the subject matter of the claims appended hereto. Those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

It is therefore an object of the present invention to provide a new and improved shopping organizer device which has all the advantages of the prior art organizer devices and none of the disadvantages.

It is another object of the present invention to provide a new and improved shopping organizer device which may be easily and efficiently manufactured and marketed.

It is a further object of the present invention to provide a new and improved shopping organizer device which is of a durable and reliable construction.

An even further object of the present invention is to provide a new and improved shopping organizer device which is susceptible of a low cost of manufacture with regard to both materials and labor, and which accordingly is then susceptible of low prices of sale to the consuming public, thereby making such shopping organizer devices economically available to the buying public.

Still yet another object of the present invention is to provide a new and improved shopping organizer device which provides in the apparatuses and methods of the prior art some of the advantages thereof, while simultaneously overcoming some of the disadvantages normally associated therewith.

Still another object of the present invention is to provide a new and improved shopping organizer device wherein the same sets forth an extensible and retractable pouch when an overlying lid is pivotally removed from a coupling organization relative to a forward wall.

These together with other objects of the invention, along with the various features of novelty which characterize the invention, are pointed out with particularly in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 1 is an isometric illustration of the instant invention.

FIG. 2 is an isometric rear view of the instant invention.

FIG. 3 is an isometric illustration of the divider as used by the instant invention.

FIG. 4 is an isometric illustration of the device illustrating the details of the abutment and ear coupling portions of the organization.

DESCRIPTION OF THE PREFERRED EMBODIMENT

With reference now to the drawings, and in particular to FIGS. 1 to 4 thereof, a new and improved shopping organizer device embodying the principles and concepts of the present invention and generally designated by the reference numeral 10 will be described.

More specifically, it will be noted that the shopping organizer device 10 essentially comprises a rigid forward wall 11 spaced from a rigid rear wall 12 with cooperating spaced right and left accordion pleated sides 13 and an unillustrated floor to enable reciprocation of the forward wall relative to the rear wall when the rigid lid 14 is withdrawn from about the forward wall 11. A rigid securement flap 15 is pivotally mounted to the forwardmost edge of the lid 14 including a first hook and loop fastener strip 16 secured to an interior surface of the flap 15 to cooperate with a second hook and loop fastener strip 17 positioned underlying an upper edge of the forward wall 11. A handle 15a is pivotally mounted to the upper surface of the lid 14 to enable easy transport of the device 10.

A multi-leaf notebook 18 is secured against an interior surface of the lid 14 utilizing spaced first and second respective elastomeric securement bands 19 and 20 diagonally oriented relative to the sides of the lid 14 to resiliently receive the notebook and secure the notebook against the interior surface, as illustrated in FIG. 1 for example. Positioned underlying the notebook 18 is a pencil sheath 31 to receive a pencil 32 therewithin.

Formed to the exterior face of the rear wall 12 is a first flexible attachment band 21 fixedly secured at one end to the rear face of the wall 12 spaced from and parallel to a second flexible attachment band 22. Each attachment band 21 and 22 includes a hook and loop attachment band section 23 formed on an interior face proximate a distal edge of each attachment band for coupling association with hook and loop attachment strips 24 to enable securement of the respective first and second attachment bands 21 and 22 about a desired portion of the shopping cart "C", such as about the handle portion "H" or selectively, about an upper link of the basket portion "B". The flexible bands enable securement of the rigid rear wall relative to a desired portion of the shopping cart "C" wherein the rigid wall enables the device 10 to be disposed in an effective orientation relative to the cart "C".

Positioned within the interior compartment of the organizer device 10 is a series of dividers 25, including a main body portion of a height substantially equal to the sides 13 of the device including an upwardly extending tab of a first height. Each of the tabs 26 includes a stack of peel-away labels 26a wherein successive labels may be peeled away and categorized as desired to accommodate variations and expanded categories within a shopping scenario.

Integrally formed to opposed ends of the upper edge of the forward wall 11 are a first and second abutment 27 and 28 respectively of a height equal to the first height, wherein the first and second upwardly extending abutments 27 are coplanar with the forward wall 11 to be received within respective pairs of downwardly depending ears set forth as the first pair of the ears 29 and the second pair of the ears 30 integrally formed and downwardly depending from the interior surface of the lid 12 spaced forwardly of the notebook 18 of a height substantially equal to the first height wherein each pair of ears is spaced a distance substantially equal to the thickness of the associated abutment 27 and 28. In this manner, when the lid 14 is in a secured orientation relative to the forward wall 11 with interengagement of the first hook and loop fastener strip 16 with a second hook and loop fastener strip 17, the ears 29 and 30 rigidly orient the forward wall 11 with respect to the rear wall 12 and maintain the geometric integrity of the device 10. Upon rearward pivotment of the lid 14 from a first secured position, as noted, to a second retracted position, as illustrated in FIG. 1, the forward wall 11 is free to extend and retract relative to the rear wall 12 by means of the accordion sides 13 to enable easier access interiorly of the compartment defined by the walls, sides, and floor of the device.

As to the manner of usage and operation of the present invention, the same should be apparent from the above description and accordingly no further discussion relative to the manner of usage and operation of the instant invention shall be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by Letters Patent of the United States is as follows:

1. A shopping organizer device for use in combination with a shopping cart having an elongate handle, a top basket positioned adjacent said handle and to an upper rear end of said cart, said device comprising, a receptacle including a rigid forward wall, a rigid rear wall including an exterior surface, and intercommunicating flexible side walls and a floor, the forward wall including an exterior face and a free upper edge, and a rigid lid defined by exterior surface overlying an interior surface and including a rear edge spaced from a forward edge, the lid pivotally mounted to said rear wall at the rear edge of said lid including a flap pivotally mounted to the forward edge of said lid, said flap including an interior surface, and a plurality of divider members positioned in said receptacle wherein each divider member of said plurality of divider members include an upwardly extending tab, each tab including a forward face, and a latch member secured to the interior surface of said flap cooperative with a further latch member positioned on an exterior face of said forward wall, and positioning means formed on said forward wall cooperating with further positioning means formed on an interior surface of said lid adjacent said flap for alignment of said lid relative to said forward wall, and securement means mounted on an exterior surface of the rear wall for selective securement to the shopping cart, and wherein each of said plurality of divider members is of a height substantially equal to that of the side walls, and the upwardly extending tab is of a first height, and wherein said positioning means include a plurality of spaced abutment members, each abutment member of a predetermined thickness and integrally formed and coplanar with said forward wall extending upwardly from the upper edge of the forward wall wherein the abutment member is of a height equal to the first height, and wherein the lid includes a plurality of spaced further latch members fixedly secured to the interior surface of the lid adjacent the flap, and wherein each of the further latch members includes a pair of spaced ears, each ear pair of the spaced ears defines a first and second ear spaced apart a distance substantially equal to the predetermined thickness of an abutment member, and each ear of said pair of spaced ears is of a length substantially equal to the first height, and the ear is arranged on the interior surface of the lid for receiving the abutment member therewithin each respective pair of spaced ears when the lid is in a downward first position.

2. A shopping organizer device as set forth in claim 1 wherein each of the tabs includes a stack of peel-away stickers positioned on a forward face of each tab.

3. A shopping organizer device as set forth in claim 2 wherein a plurality of spaced elastic bands are secured adjacent the rear edge of the lid, and a notebook is resiliently mounted within said plurality of spaced elastic bands.

4. A shopping organizer device as set forth in claim 3 further including a sheath secured to the interior surface of said lid underlying the bands and including a writing instrument selectively receivable within said sheath.

5. A shopping organizer device as set forth in claim 4 wherein the securement means comprises a first and second attachment band each secured to an exterior surface of the rear wall parallel to one another, wherein each attachment band includes a first hook and loop fastener surface formed adjacent a terminal end of each band selectively cooperative with a second hook and loop fastener surface underlying each band on the rear wall.

6. A shopping organizer device as set forth in claim 5 wherein the lid is pivotal to a second position wherein the flap is spaced from the forward wall and wherein the forward wall is extensible and retractable relative to the rear wall when the lid is in a second position, and the forward wall is rigidly oriented relative to the rear wall when the lid is in the first position.

* * * * *